No. 614,259. Patented Nov. 15, 1898.
W. W. BOULDRY.
INSTRUMENT FOR DETERMINING ANGLES IN FRAMING BUILDINGS.
(Application filed Mar. 22, 1898.)
(No Model.)
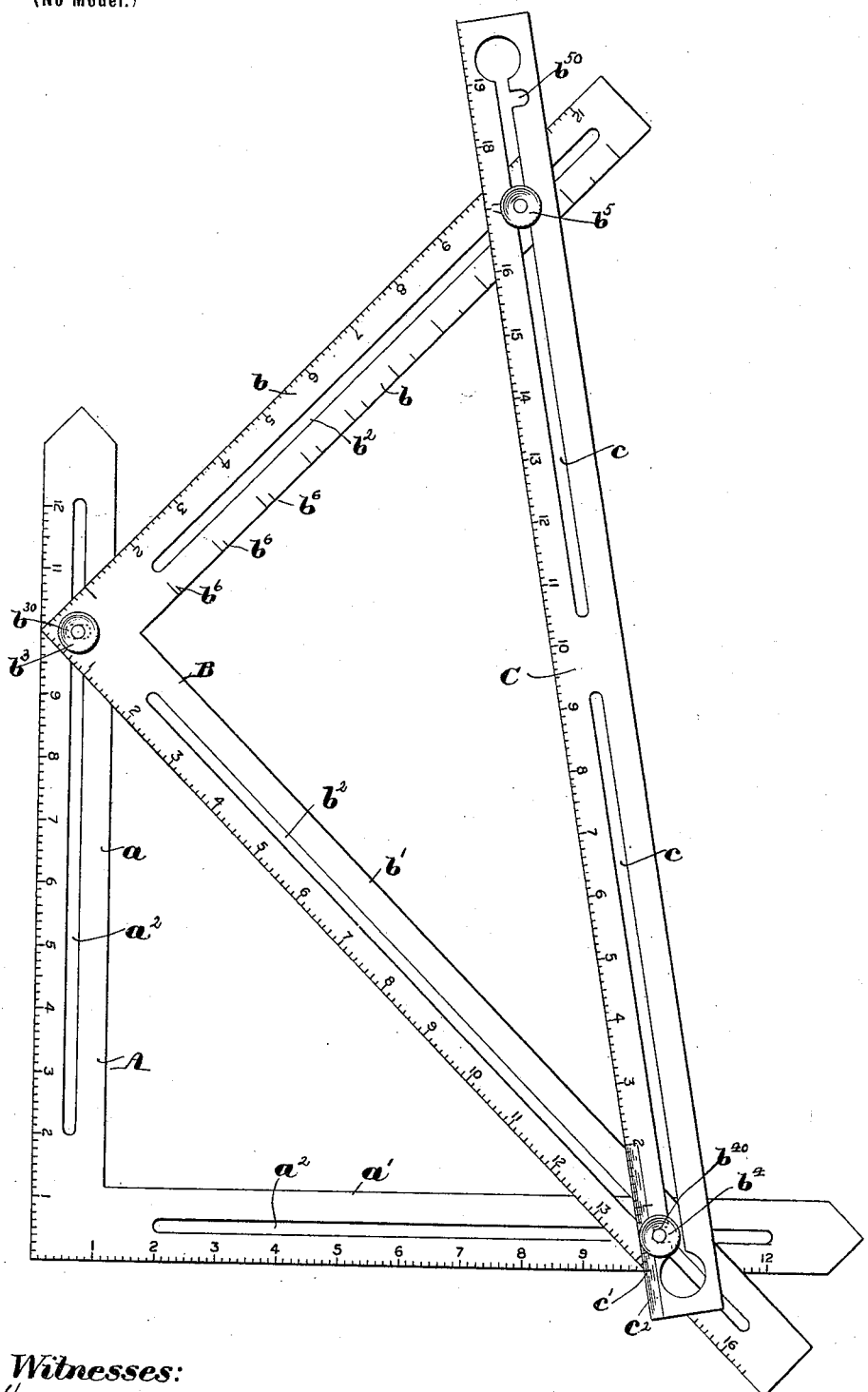
Witnesses:
Inventor:
William W. Bouldry,
by Crosby Gregory, Attys.

UNITED STATES PATENT OFFICE.

WILLIAM W. BOULDRY, OF WEYMOUTH, MASSACHUSETTS.

INSTRUMENT FOR DETERMINING ANGLES IN FRAMING BUILDINGS.

SPECIFICATION forming part of Letters Patent No. 614,259, dated November 15, 1898.

Application filed March 22, 1898. Serial No. 674,731. (No model.)

*To all whom it may concern:*

Be it known that I, WILLIAM W. BOULDRY, of South Weymouth, county of Norfolk, State of Massachusetts, have invented an Improvement in Instruments for Determining Pitches and Angles in Framing Buildings, of which the following description, in connection with the accompanying drawing, is a specification, like letters on the drawing representing like parts.

My invention is an instrument for the use of carpenters to aid them in determining the pitches, bevels, and angles in any building or similar construction, and has for its object the provision of simple means for accurately and quickly aiding the plotter or carpenter to determine the required length, pitch, and bevel of all timbers used in a building having any given dimension. By this instrument the measurements may be determined with certainty for any roof—for instance, from the flattest, as a tarred roof, to the steepest, as a church-steeple—and these measurements are ascertained largely automatically by simply setting the instrument to a given base or starting measurement. Also it is especially serviceable in determining the pitch and lengths of valley, hip, and jack rafters where two similar roofs meet at right angles to each other.

The details of construction of my invention and the operation thereof will be more fully apprehended from the following description, reference being had to the accompanying drawing, and the invention will be more particularly defined in the appended claims.

In the drawing, in which I have shown a preferred embodiment of my invention, the figure represents the instrument in top plan adjusted for use.

Preferably I construct the instrument of brass or steel, such as is commonly used in the manufacture of carpenters' squares, although any other suitable material may be employed.

A designates the base member of my invention, and is shown as a square having two arms or blades $a\ a'$ of equal length and each provided with a central longitudinal slot $a^2$. These arms are graduated according to any scale desired, being shown as marked off in inches, as is usual in squares.

Adjustably mounted on the base member A is a second member B, also in the form of a square, having an arm or blade $b$ equal in length to the respective blades of the base member and an arm or blade $b'$ having a length corresponding to the hypotenuse of the square A. These two arms $b\ b'$ are also provided with longitudinal slots $b^2$, and the member B is provided with a set-screw $b^3$ at its corner and a set-screw $b^4$ in the arm $b'$, whereby it may be adjusted in either direction in either or both of the slots $a^2$.

On the member or square B is mounted an auxiliary bar C, having longitudinal slots $c$ and adjustably secured to the member B by the set-screw $b^4$ at one end and a set-screw $b^5$ at the other end. Each of these parts or members is graduated to a scale corresponding to the graduations marked on the square A.

In use it is essential that the corner of the member B should aline with extreme accuracy along the vertical edge of the arm $a$, and, as will be evident, inasmuch as the changing position of the arm $b'$ as it is adjusted up and down in the vertical slot $a^2$ will vary the relative position of this corner along the edge of the member A, I provide means for compensating for this change by making the pivot-slot in which the set-screw $b^3$ is mounted slightly elongated, as indicated by dotted lines at $b^{30}$, so that the operator may at times adjust the corner with extreme accuracy and delicacy in perfect alinement with the edge of the arm $a$ as required. Similarly it is necessary that the bar C should have its first graduation $c'$ in accurate alinement with the lower edge of the arm $a'$, and accordingly I have beveled the edge of the bar C, as indicated at $c^2$, in order to give an accurate reading, and, moreover, as the same change of position, and consequent liability to inaccuracy, takes place at this point that I have already explained in connection with the corner of the square B, I provide an offset in the slot $c$, as indicated by dotted lines at $b^{40}$, so that the bar may be slightly adjusted one way or the other relatively to the set-screw without materially changing its pivotal bearing. Also I provide a similar offset at the opposite end of the bar, as indicated at $b^{50}$, for use when it is desired to take the readings from the arm $b$ as a base instead of from the arm $a'$ as a base, as will be explained presently.

The manner of using this instrument is as follows: Supposing that it is desired to construct a roof having a width of sixteen feet and a height of eleven feet, the arm $b'$ is adjusted along the member A until the corner adjacent the set-screw $b^3$ accurately indicates the height at "11," (taking a scale of one inch to the foot,) and then its lower end is adjusted along the arm $a'$ until the point $c'$ registers with the graduation at "8," (the latter being half of the prescribed width of the roof.) From this the reading of the arm $b'$ indicates the length of the rafters of the roof, and the angles of the arm $b'$ relatively to the arms $a$ $a'$, respectively, indicate the bevels to which the rafters must be cut or mitered. Now if two such roofs are to be built at right angles to each other the bar C is adjusted along the arm $b$ until it coincides with the graduation of the latter corresponding to the height of the roof. The coinciding mark on the bar C will then indicate the length of the valley-rafter, and the angles at the respective ends of the bar will indicate the pitch or bevels on which the valley-rafter must be cut. Then in order to get the lengths and bevels of the jack-rafters, the bar C remaining set, as stated, a ruler is held parallel to the arm $b'$ and is shifted along the arm $b$, and if these rafters are to be two feet apart the lengths and bevels thereof will be correctly indicated by the distance on the ruler from the bar at the successive two inches of movement as it slides along the arm $b$, or, in other words, the graduation which coincides with "2" on the arm $b$ will indicate the length of the longest jack-rafter from the valley-rafter, and the graduation which coincides with "4" on the arm $b$ will indicate the length of the second jack-rafter, and the corresponding graduations which coincide, respectively, with "6," "8," "10," &c., will indicate the third, fourth, fifth, &c., jack-rafter.

If a flatter roof than that supposed is desired, the set-screw $b^3$ is loosened and the corner of the square B is lowered to the point indicating the height of the king-post desired for the roof, it being evident that this may be indicated down to a practically flat roof—such, for instance, as a gravel roof—or if an exceedingly steep roof is desired it may be found by raising the pivotal point $b^3$ and bringing in the pivotal point $b^4$, and a further range of measurements may be had by inverting the instrument and using the arm $b$ as a base and the arm $b'$ to indicate the height of the roof—for example, such as a steeple—in which case the bar C will indicate the pitch-line of the roof.

I have supposed in the above description that the jack-rafters, for instance, are to be spaced apart at ordinary intervals. If, however, it should be found that such spacing of the jack-rafters would leave an unoccupied space—i. e., if there were five spaces for four rafters—I make provision for giving the requisite increment to the spacing distances, so that the entire space will be properly and evenly occupied by the desired number of rafters. This provision is indicated on the lower side of the arm $b$, where it will be observed that I have placed a series of short marks $b^6$ at successively-increasing distances from the adjacent long marks, the latter corresponding to the inches of the graduation, so that if the total space to be occupied by the jack-rafters when divided by the distance apart—two feet, for example—usual for jack-rafters comes out even then the longer marks will be used; but if this space when so divided does not come out evenly then the short marks $b^6$ will be used, thereby automatically adding to each jack-rafter the required increment of length in order to make the jack-rafters occupy all the space at uniform intervals.

While I have herein described my invention as applied to building construction and have set forth its capabilities of use in relation to the carpenter's art, yet I wish it understood that my invention is capable of use in many other relations and will readily and accurately give the desired angles and proportions and measurements wherever the latter are required, according to the circumstances of the case; also, I wish it understood that I do not intend herein to limit myself otherwise than as expressed in the claims.

Having described my invention, what I claim, and desire to secure by Letters Patent, is—

1. An instrument of the class described consisting of a base member in the form of a square having its arms longitudinally slotted, a second member in the form of a square also having its arms longitudinally slotted, said second member being adjustably mounted at its corner to move longitudinally on one arm of the base member, a set-screw adjustably joining the other slotted arm of the base member and the adjacent slotted arm of the second member, and a bar extending from arm to arm of said second member and adjustably mounted thereon, substantially as described.

2. In an instrument of the kind described, the combination of two squares and a bar, all correspondingly graduated, one square being adjustably mounted at its corner on one of the arms of the other square, and having one of its arms connected to one end of the bar and adjustably mounted on the other arm of said square, the free end of said bar being adjustable along the remaining arm of said first-mentioned square, substantially as described.

3. The combination of a base-square having arms of equal length, a second square having one arm of a length corresponding to the arms of the other square, and having its other arm of a length corresponding to the hypotenuse of said base-square, said second square being adjustably mounted on the respective arms of the base-square by pivots respectively at its corner and along its longer arm, said corner-pivot having an elongated slot to permit limited lateral movement of the second square transversely of the adjacent arm of the base-square, substantially as described.

4. A base-square, a second square adjustably mounted thereon at its corner along one arm of the base-square, and at one of its free ends along the other arm of the base-square, and a bar adjustable along and transversely of the two arms of said second square, said bar being held by a set-screw at its end adjacent the coinciding free ends of said two squares, and having its edge coinciding accurately with the meeting point of the edges of said two free ends, substantially as described.

5. A base-square, a second square adjustably mounted thereon at its corner along one arm of the base-square, and at one of its free ends along the other arm of the base-square, and a bar adjustable along and transversely of the two arms of said second square, said bar being held by a set-screw at its end adjacent the coinciding free ends of said two squares, and having its edge coinciding accurately with the meeting point of the edges of said two free ends, and means for accurately adjusting said bar to maintain said coincidence, substantially as described.

6. In an instrument of the kind described, the combination of two squares and a bar, all correspondingly graduated, one square being adjustably mounted at its corner on one of the arms of the other square, and having one of its arms connected to one end of the bar and adjustably mounted on the other arm of said square, the free end of said bar being adjustable along the remaining arm of said first-mentioned square, the latter square having one of its arms also provided with graduations $b^6$, as and for the purpose set forth.

In testimony whereof I have signed my name to this specification in the presence of two subscribing witnesses.

WILLIAM W. BOULDRY.

Witnesses:
EDITH M. STODDARD,
G. H. MAXWELL.